United States Patent
Mitra (10) Patent No.: US 11,182,142 B2
(45) Date of Patent: Nov. 23, 2021

(54) METHOD AND SYSTEM FOR DYNAMIC DEPLOYMENT AND VERTICAL SCALING OF APPLICATIONS IN A CLOUD ENVIRONMENT

(71) Applicant: Wipro Limited, Bangalore (IN)

(72) Inventor: Sumit Shovon Mitra, New Town (IN)

(73) Assignee: Wipro Limited, Bangalore (IN)

(*) Notice: Subject to any disclaimer, the term of this patent is extended or adjusted under 35 U.S.C. 154(b) by 0 days.

(21) Appl. No.: 16/702,883

(22) Filed: Dec. 4, 2019

(65) Prior Publication Data
US 2021/0109732 A1 Apr. 15, 2021

(30) Foreign Application Priority Data
Oct. 10, 2019 (IN) .............................. 201941041043

(51) Int. Cl.
*G06F 8/61* (2018.01)
*G06F 8/60* (2018.01)
(Continued)

(52) U.S. Cl.
CPC .................. *G06F 8/63* (2013.01); *G06F 8/60* (2013.01); *G06F 12/0862* (2013.01); *G06N 3/08* (2013.01)

(58) Field of Classification Search
CPC ......... G06F 8/60–71; G06N 3/02; G06N 3/08
(Continued)

(56) References Cited

U.S. PATENT DOCUMENTS 7,188,163 B2 * 3/2007 Srinivasan .......... G06F 9/44505
709/220
7,707,573 B1 * 4/2010 Marmaros ............... H04L 67/34
717/178
(Continued)

FOREIGN PATENT DOCUMENTS

CN 102681899 A 9/2012
CN 102981890 A 3/2013

OTHER PUBLICATIONS

Bruno, R., et al., Dynamic Vertical Memory Scalability for OpenJDK Cloud Applications, ISMM 2018: Proceedings of the 2018 ACM SIGPLAN International Symposium on Memory Management, Jun. 2018, pp. 59-70, [retrieved on Aug. 5, 2021], Retrieved from the Internet: <URL:http://dl.acm.org/>.*
(Continued)

*Primary Examiner* — Geoffrey R St Leger
(74) *Attorney, Agent, or Firm* — Finnegan, Henderson, Farabow, Garrett & Dunner, LLP (57) ABSTRACT

The present invention discloses method and application deployment system for dynamic deployment and vertical scaling of applications in a cloud environment. The application deployment system receives information of one or more system parameters of a target system and performs one or more processing operations on information to identify storage access details for a predefined time period of the target system. Further, an ideal configuration for the target system is estimated based on current requirement of one or more system parameters and the identified storage access details by using at least one of a rule-based model, a neural network model, and statistical model. Thereafter, the application deployment system performs dynamic deployment of the one or more applications based on the ideal configuration.

18 Claims, 7 Drawing Sheets

(51) Int. Cl.
*G06F 12/0862* (2016.01)
*G06N 3/08* (2006.01)

(58) Field of Classification Search
USPC .................................................. 717/168–178
See application file for complete search history.

(56) References Cited

U.S. PATENT DOCUMENTS

| | | | | |
|---|---|---|---|---|
| 9,678,968 | B1* | 6/2017 | Taylor | G06F 3/0608 |
| 10,740,208 | B2* | 8/2020 | Bryant | G06F 11/3414 |
| 10,795,655 | B1* | 10/2020 | Verma | H04L 67/288 |
| 10,846,135 | B2* | 11/2020 | Brandwine | G06F 8/65 |
| 2003/0101245 | A1* | 5/2003 | Srinivasan | G06F 9/44505 |
| | | | | 709/221 |
| 2012/0239739 | A1* | 9/2012 | Manglik | G06F 9/5077 |
| | | | | 709/203 |
| 2017/0090914 | A1* | 3/2017 | Pandey | G06F 8/36 |
| 2017/0213156 | A1 | 7/2017 | Hammond et al. | |
| 2018/0191867 | A1 | 7/2018 | Siebel et al. | |
| 2019/0138290 | A1* | 5/2019 | Garvey | G06N 20/00 |
| 2019/0250951 | A1* | 8/2019 | Brandwine | G06F 9/5005 |
| 2020/0110691 | A1* | 4/2020 | Bryant | G06F 9/5077 |
| 2020/0301685 | A1* | 9/2020 | Verma | H04L 67/289 |

OTHER PUBLICATIONS

Gandhi, A., et al., Modeling the Impact of Workload on Cloud Resource Scaling, 2014 IEEE 26th International Symposium on Computer Architecture and High Performance Computing, Oct. 22-24, 2014, pp. 310-317, [retrieved on Aug. 5, 2021], Retrieved from the Internet: <URL:http://ieeexplore.ieee.org/>.*

* cited by examiner

| Parameters Name | Collection Intervals * | Parameter explanation |
|---|---|---|
| CPU Utilization | Min / Max / Avg. within time 't' | CPU Utilization of the overall system |
| Process Specific CPU Utilization | Top n+ process CPU utilization within time 't' | CPU Utilization of top n process |
| Memory Utilization | Min / Max / Avg within time 't' | Overall system Memory Utilization |
| Process Specific Memory Utilization | Top n process Memory utilization within time 't' | Memory Utilization of top n process |
| Storage I/O | Min / Max / Avg within time 't' | Storage I/O of the overall system |
| Process Specific Storage I/O + | Top n process Storage I/O utilization within time 't' | Storage I/O for top n process |
| Memory - Cache / Buffered | Min / Max / Avg within time 't' | System wide memory cache/buffer used |
| Process Specific Data Cache | Max cache/buffer used by top n process | Stop n process cache usage |
| Network Utilization | Min / Max / Avg within time 't' | Network utilization of the overall system |
| Process Specific Network Utilization | Max Network I/O used by top n process | |

Fig.3a

| Parameters Name | Collection Intervals * | Parameter explanation |
|---|---|---|
| Storage Access | All access within 't' time interval | The storage block(b) and timestamp(t) is collected (e.g. $\{b_0, t_0\}, \{b_1, t_1\} ... \{b_n, t_n\}$) |
| Storage Miss | Memory cache miss for the storage within 't' time interval | The storage block miss (m) and timestamp(t) is collected (e.g. $\{m_0, t_0\}, \{m_1, t_1\}...\{b_n, t_n\}$) |
| API access | All API access and their response time within 't' time interval | The API's also means any URI, REST API's, RPC calls. The API(a) hash (part of URI, REST calls) and associated timestamp (t) is collected |

METHOD AND SYSTEM FOR DYNAMIC DEPLOYMENT AND VERTICAL SCALING OF APPLICATIONS IN A CLOUD ENVIRONMENT

TECHNICAL FIELD

The present subject matter is related in general to cloud computing and cloud computing applications, more particularly, but not exclusively to a method and system for dynamic deployment and vertical scaling of applications in a cloud environment.

BACKGROUND

In a computing environment, every application needs computing power like Central Processing Unit, storage such as, volatile fast memory to process intermediate data, for example, RAM and non-volatile storage system to store results/collected information's, network and the like. In current scenario, computing applications are moving towards cloud deployment. A cloud can be a public, private and hybrid cloud. In addition, in-place virtualization also co-exists to provide flexible dynamic deployment within already established data centre infrastructure.

In existing systems, the computing applications are deployed within virtualized environment as a standalone application or within a container for enhanced portability. The virtualized/containerized environment provides flexibility and horizontal scaling of applications. In horizontal scale-in/out, a basic unit is chosen, and units are added/deleted as per loads. The unit size is defined based on processing power (CPU), volatile memory (RAM), storage, network and the like. Cost of the single unit is heavily dependent on the CPU and RAM capacity and to a lesser extent on storage and network. Hence, cost of cloud deployment depends on the resource usages (units) and optimal selection of units based on time is critical for cost optimization. Thus, in current cloud deployment scenario, underutilized resources can incur cost. Also, in existing systems, addition/deletion of units in real-time may lead to downtime of the applications. In addition, if unit size is under-provisioned, performance of the applications degrades substantially during peak load scenario and affects customer satisfaction and reputation. Hence, dynamic change of the unit size would be useful to optimize cost, which is called vertical scaling. The existing systems lack mechanism to provide dynamic deployment and vertical scaling of the applications and lack in better utilisation of resources.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure may relate to a method for dynamic deployment and vertical scaling of applications in a cloud environment. The method includes receiving information of one or more system parameters required by one or more applications of a target system and performing one or more processing operations on the information to identify storage access details for a predefined time period of the target system. The storage access details comprise information on previously accessed and cached storage blocks. Further, the method includes estimating an ideal configuration for the target system based on current requirement of one or more system parameters and the identified storage access details, by using at least one of a rule-based model, a neural network model, and statistical model. Thereafter, the method includes performing dynamic deployment of the one or more applications based on the ideal configuration.

In an embodiment, the present disclosure may relate to an application deployment system for dynamic deployment and vertical scaling of applications in a cloud environment. The application deployment system may include a processor and a memory communicatively coupled to the processor, where the memory stores processor executable instructions, which, on execution, may cause the application deployment system to receive information of one or more system parameters required by one or more applications of a target system and perform one or more processing operations on the information to identify storage access details for a predefined time period of the target system. The storage access details comprise information on previously accessed and cached storage blocks. Further, the application deployment system estimates an ideal configuration for the target system based on current requirement of one or more system parameters and the identified storage access details, by using at least one of a rule-based model, a neural network model, and statistical model. Thereafter, the application deployment system performs dynamic deployment of the one or more applications based on the ideal configuration.

In an embodiment, the present disclosure relates to a non-transitory computer readable medium including instructions stored thereon that when processed by at least one processor may cause an application deployment system to receive information of one or more system parameters required by one or more applications of a target system and perform one or more processing operations on the information to identify storage access details for a predefined time period of the target system. The storage access details comprise information on previously accessed and cached storage blocks. Further, the instruction causes the processor to estimate an ideal configuration for the target system based on current requirement of one or more system parameters and the identified storage access details, by using at least one of a rule-based model, a neural network model, and statistical model. Thereafter, the instruction causes the processor to perform dynamic deployment of the one or more applications based on the ideal configuration.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

FIG. 3a-FIG. 3b shows exemplary tables of system parameters for a target system for vertical scaling of applications in accordance with some embodiments of the present disclosure;

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however, that it is not intended to limit the disclosure to the particular forms disclosed, but on the contrary, the disclosure is to cover all modifications, equivalents, and alternative falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Embodiments of the present disclosure may relate to a method and an application deployment system for dynamic deployment and vertical scaling of applications in a cloud environment. Vertical scaling refers to an ability to increase capacity of an existing hardware or software, such as computing applications by adding resources on demand. Alternatively, vertical scaling refers to an ability to connect multiple hardware or software entities, such as servers etc., to work as a single logical unit. Typically, in existing scenarios, computing applications are deployed within virtualized environment as standalone application or within containerized for enhanced portability. The virtualized/containerized environment provides flexibility and horizontal scaling out. However, horizontal scaling of the applications leads issues such as, cost effectiveness, performance and the like.

Thus, in such scenarios, the present disclosure performs dynamic vertical scaling of one or more application of a target system by estimating an ideal configuration for the target system in current situation depending on current requirement of various system resources by the one or more applications. The ideal (optimal) configuration is estimated using at least one of pretrained rule-based model, a neural network model, and statistical model. Thus, the present disclosure does not depend on static configuration of target system and continuously predicts ideal configuration for the target system based on actual usage of resources.

Figure 1:
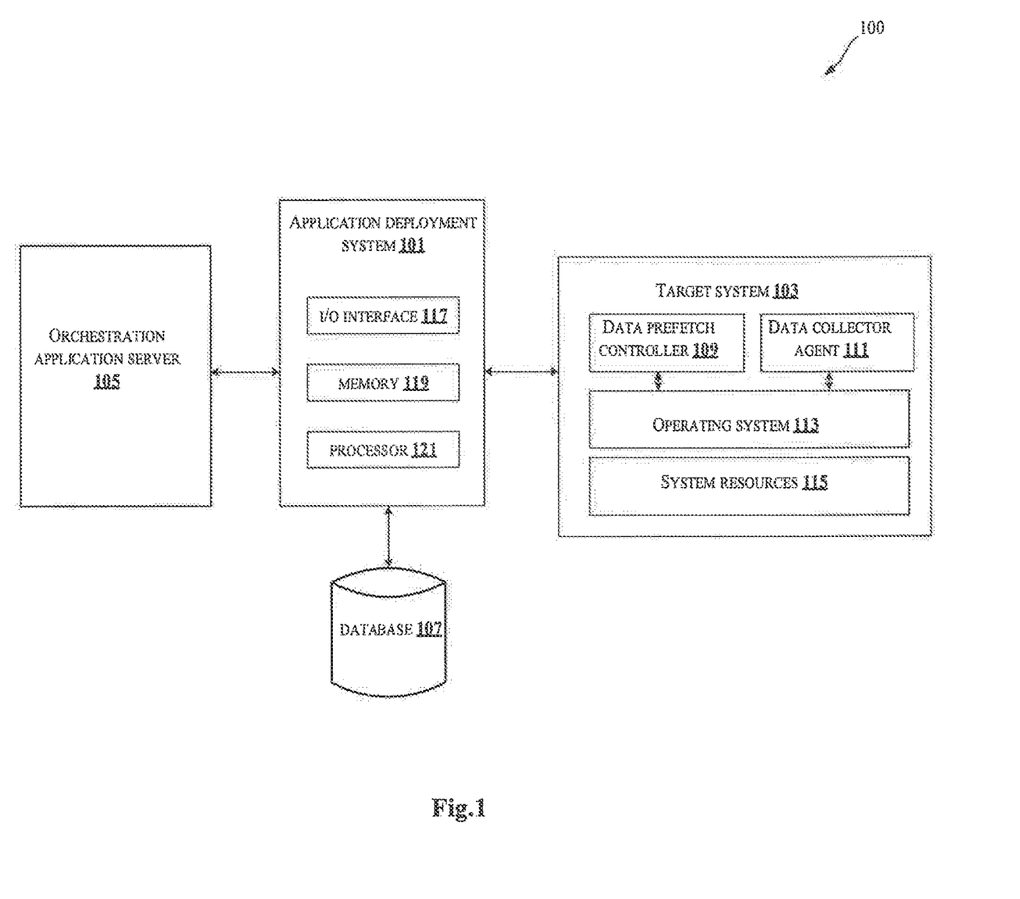
FIG. 1 illustrates an exemplary environment for dynamic deployment and vertical scaling of applications in a cloud environment in accordance with some embodiments of the present disclosure.

FIG. 1 illustrates an exemplary environment for dynamic deployment and vertical scaling of applications in a cloud environment in accordance with some embodiments of the present disclosure.

As shown in FIG. 1, an environment 100 includes an application deployment system 101 connected to a target system 103 and an orchestration application server 105. The application deployment system 101, the target system 103 and the orchestration application server 105 are connected through communication network (not shown explicitly in FIG. 1). The communication network may include, but is not limited to, a direct interconnection, an e-commerce network, a Peer-to-Peer (P2P) network, Local Area Network (LAN), Wide Area Network (WAN), wireless network (for example, using Wireless Application Protocol), Internet, Wi-Fi and the like. In an embodiment, the target system 103 refer to any computing system which is under virtualised environment.

The target system 103 may include one or more applications for different functionality of the target system 103. An example of a type of application may be education related applications, business applications and the like. As shown in FIG. 1, the target system 103 includes a data prefetch controller 109, a data collector agent 111, operating system 113 and system resources 115. The target system 103 may also include any other component, not shown herein explicitly. A detailed explanation of each component of the target system 103 is explained in FIG. 2b below. The orchestration application server 105 is used for orchestrating the target system 103 based on the processing by the application deployment system 101.

The target system 103 and the orchestration application server 105 may be connected to a load balancer (not shown explicitly). Thus, any internal and external request for the target system 103 is passed via the load balancer for controlling data traffic.

Further, the application deployment system 101 is connected to a database 107. The database 107 includes data related to one or more applications of the target system 103 and different models. The application deployment system 101 performs vertical scaling of the one or more application in the cloud environment. In one embodiment, the application deployment system 101 may include, but is not limited to, a laptop, a desktop computer, a notebook, a smartphone, IOT devices, a tablet, a server, and any other computing devices. A person skilled in the art would understand that, any other devices, not mentioned explicitly, may also be used as the application deployment system 101 in the present disclosure. Further, the application deployment system 101 may include an I/O interface 117, a memory 119 and a processor 121. The I/O interface 117 may be configured to receive data from the target system 103. The data from the I/O interface 117 may be stored in the memory 119. The memory 119 may be communicatively coupled to the processor 121 of the application deployment system 101. The memory 119 may also store processor instructions which may cause the processor 121 to execute the instructions for dynamic deployment and vertical scaling of applications.

The application deployment system 101 may train a neural network model using historic data associated with usage of resources by the target system 103 by machine learning techniques. In an embodiment, the neural network model may be stored in the database 107. Alternatively, the neural network model may be stored in the application deployment system 101.

Consider a real-time situation, when the target system 103 is deployed under the virtual environment and scaling of applications in the target system 103 is required. In such case, the application deployment system 101 may perform vertical scaling for the one or more applications of the target system 103. The application deployment system 101 may receive information regarding one or more system parameters required by the one or more applications of the target system 103 through the data collector agent 111. The information on the one or more parameters is collected by the data collector agent 111 in current situation of the target system 103. The one or more system parameters system may include, but not limited to, Central Processing Unit (CPU) utilization, memory, cache memory, and network utilisation of the target system 103, information about one or more Application Programming Interface (API) access, CPU, memory, cache memory, and network utilization by the one or more applications.

The information on the one or more system parameters are analysed by performing one or more processing operations. The one or more processing operations include, but not limited to, error detection and correction, selection of a data window, normalization, segregation, data labelling, and data enrichment on the one or more system parameters. Each of the processing operations are explained in detail in further figures of the description. Based on the one or more processing operations, the application deployment system 101 identifies storage access details for a predefined time period, for example, 5 am-3 pm, of the target system 103. The storage access details may include information on previously accessed and cached storage blocks. Caching of the storage blocks is explained at later part of the description with accompanying figures.

Further, the application deployment system 101 estimates an ideal or optimal configuration for the target system 103 based on current requirement of one or more system parameters and the identified storage access details. The ideal configuration is estimated using at least one of a rule-based model, a neural network model, and statistical model. The neural network model is pretrained by the application deployment system 101. A detailed explanation of each of the model is explained in detail in further figures of the present disclosure. Once the ideal configuration is estimated, the application deployment system 101 orchestrates the target system 103 based on the ideal configuration. However, the orchestration of the target system 103 is performed after performing a prefetch operation for the storage blocks and Application Programming Interface (API) in order to activate cached storage blocks.

In addition, performance of the target system 103 is continuously monitored after the orchestration. Based on the monitoring, in case of performance issues in the target system 103, the application deployment system 101 may reconfigure/restore the target system 103 to previous configuration. Alternatively, in case of no issues are identified during monitoring, the application deployment system 101 may decommission the previous configuration of the one or more applications. Thus, once the ideal configuration for current situation of the target system 103 is estimated and orchestrated, the application deployment system 101 performs dynamic deployment of the one or more applications based on the ideal configuration.

Figure 2A:
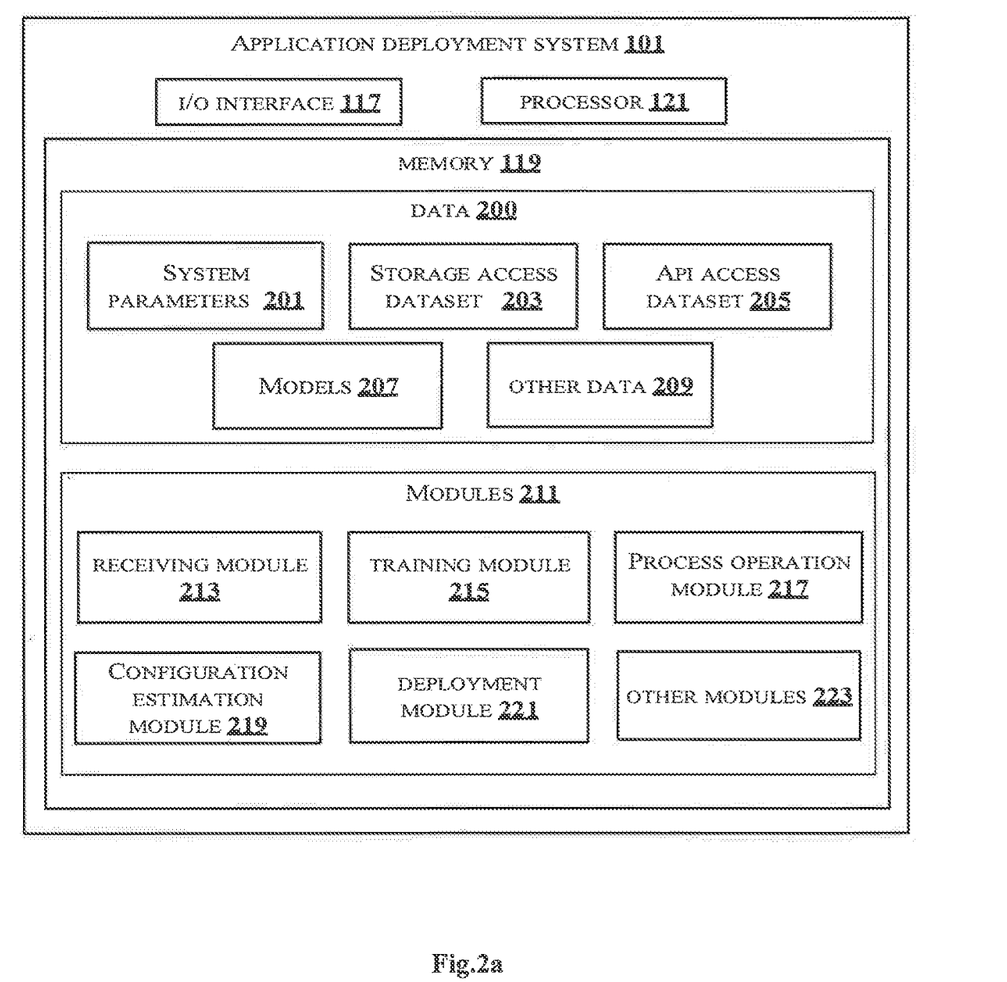
FIG. 2a shows a detailed block diagram of an application deployment system in accordance with some embodiments of the present disclosure.

FIG. 2a shows a detailed block diagram of an application deployment system in accordance with some embodiments of the present disclosure.

The application deployment system 101 may include data 200 and one or more modules 211 which are described herein in detail. In an embodiment, data 200 may be stored within the memory 119. The data 200 may include, for example, system parameters 201, storage access dataset 203, Application Programming Interface (API) access dataset 205, models 207 and other data 209.

The system parameters 201 may include information regarding system resources required by the one or more applications of the target system 103. The system parameters 201 may include, but not limited to, Central Processing Unit (CPU) utilization, memory, cache memory, and network utilisation of the target system 103, information about one or more Application Programming Interface (API) access, CPU, memory, cache memory, and network utilization by the one or more applications.

The storage access dataset 203 may include information on previously accessed and cached storage blocks in the one or more application.

The API access dataset 205 may include information on the API for accessing in the target system 103.

The models 207 may include the rule-based model, the neural network model, and the statistical model. The rule-based model includes a predefined set of rules for estimating the ideal configuration of the target system 103. The neural network model is a pre-trained model using the plurality of historic application data.

The other data 209 may store data, including temporary data and temporary files, generated by modules 211 for performing the various functions of the application deployment system 101.

In an embodiment, the data 200 in the memory 119 are processed by the one or more modules 211 present within the memory 119 of the application deployment system 101. In an embodiment, the one or more modules 211 may be implemented as dedicated units. As used herein, the term module refers to an application specific integrated circuit (ASIC), an electronic circuit, a field-programmable gate arrays (FPGA), Programmable System-on-Chip (PSoC), a combinational logic circuit, and/or other suitable components that provide the described functionality. In some implementations, the one or more modules 211 may be communicatively coupled to the processor 121 for performing one or more functions of the application deployment system 101. The said modules 211 when configured with the functionality defined in the present disclosure will result in a novel hardware.

In one implementation, the one or more modules 211 may include, but are not limited to a receiving module 213, a training module 215, a process operation module 217, a configuration estimation module 219 and a deployment module 221. The one or more modules 211 may also include other modules 223 to perform various miscellaneous functionalities of the application deployment system 101. In an embodiment, the other modules 223 may include orchestrating module.

The receiving module 213 may receive the system parameters 201 required by the one or more applications of the target system 103. The system parameters 201 are collected from the data collector agent 111 of the target system 103. In an embodiment, the system parameters 201 are collected and transmitted as a time-series. FIG. 3a-FIG. 3b shows exemplary tables of system parameters in accordance with some embodiments of the present disclosure. As shown, FIG. 3a shows a table which includes different types of collected parameters. FIG. 3b shows a table which includes different resource access in the target system 103 for a predefined duration. The tables list down different parameters but not limited to collected by the data collector agent 111 of the target system 103. For instance, parameters in FIG. 3a is defined as $P_{type}=\{pv_t^{type}\}$, Where pv is parameter value of "type" at time t. Once this value is collected Min/Max/Avg. values are determined within a specific time duration "T" as $P_{ptype-all}=\{pv_T^{avg}, pv_T^{min}, pv_T^{max})\}$.

For example, consider CPU usage data as below:
$P_{cpu}=\{(10\%, 1), (5\%, 2), (15\%, 3) \ldots (p_n, t_n)\}$
$P_{cpu-all}=\{(1-t_n), avg=10\%, min=1\%, max=50\%\}$
Further, parameters defined in FIG. 3b is defined as $A_{type}=(av_t^{type})$, which is the access number at time t of "type". This is values of (time, access number).
For instance, for block(s) access the values may be, $A_{block}=\{((10, 5, 20), 1), ((20, 2, 40), 2) \ldots ((n_1, n_2, n_3, \ldots), t)$.

Figure 2B:
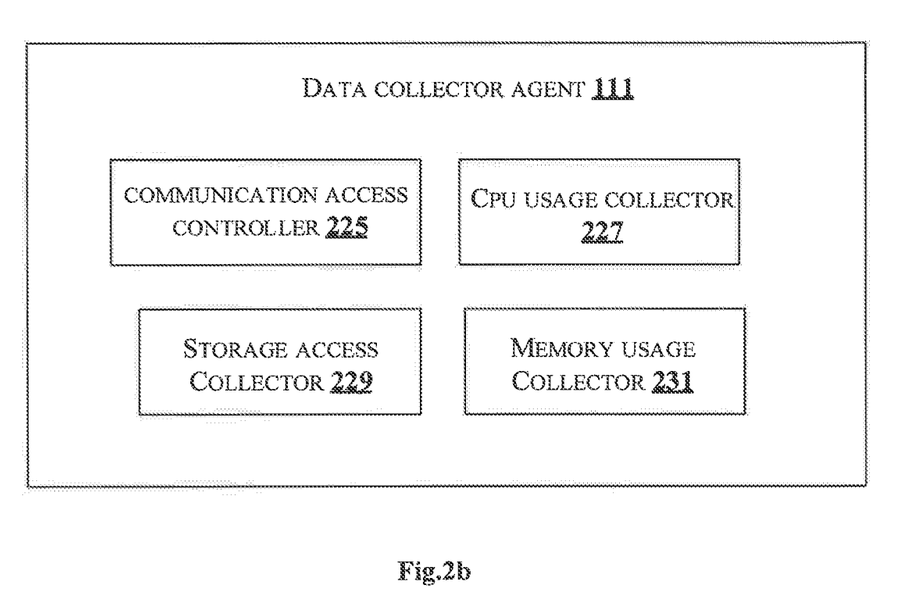
FIG. 2b shows an exemplary block diagram of a data collector agent of target system in accordance with some embodiments of the present disclosure.

FIG. 2b shows an exemplary block diagram of a data collector agent of target system in accordance with some embodiments of the present disclosure. As shown in FIG. 2b, the data collector agent 111 comprises a communication access controller 225, a CPU usage collector 227, a storage access collector 229 and a memory usage collector 231. The communication access controller 225 collects information regarding usage and load of communication devices at per-defined intervals. The CPU usage collector 227 collects information on usage of the CPU at predefined intervals. The storage access collector 229 collects the usage and load of the storage at pre-defined intervals. Further, the storage access collector 229 collects exact access information (block level read/write) information of various storage blocks along with state in memory. For example, if the storage block is cached. The memory usage collector 231 collects information on the memory usage such as, used, free, cache/buffered and the like.

Figure 4:
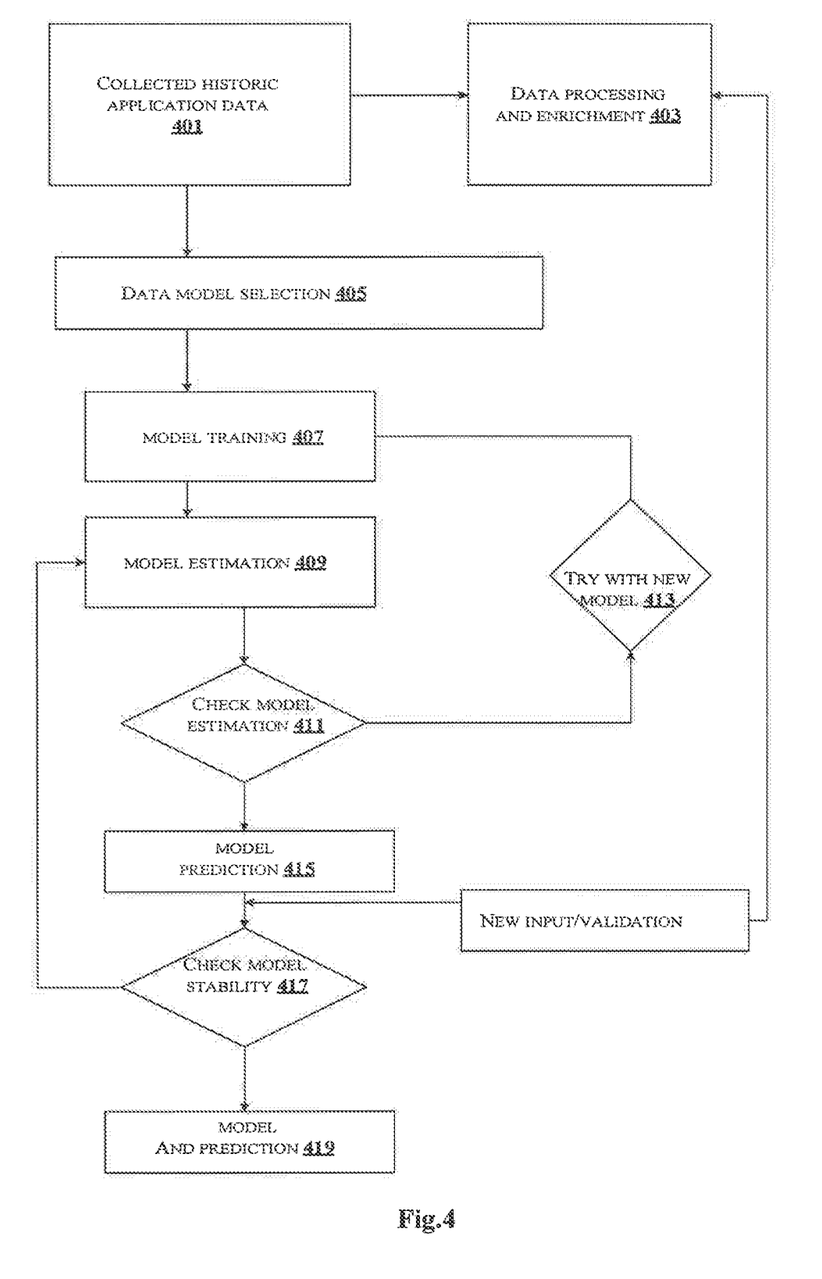
FIG. 4 shows a flowchart for training neural network model for estimating an ideal configuration of target system in accordance with some embodiments of the present disclosure.

Referring to FIG. 2a, the training module 215 may train the neural network model based on the historic application data for the target system 103. In an embodiment, the training may be performed offline. In an embodiment, the training may be performed external to the application deployment system 101. The training module 215 may train the neural network model using machine learning techniques. FIG. 4a shows a flowchart for training neural network model in accordance with some embodiments of the present disclosure. As shown in FIG. 4a, at 401 and 403, historic data of applications are collected and processed. At 405, the training module 215 may select type of model such as, regression, time-series etc. At 407, the training module 215 trains the selected neural network model. At 409, the training module 215 estimates the neural network model based on the training. At 411, the training module 215 may check if the model estimation is acceptable. If the estimation is not acceptable, the training module 215 at 413 may check for a new model. Alternatively, if the estimation is acceptable, the training module 215 at 415 predict the neural network model. At 417, the training module 215 may check if the predicted neural network model is stable. If the predicted neural network model is stable, at 419, the training module 215 provides the neural network model. Alternatively, if the predicted neural network model is not stable, the training module 215 check model estimation.

Referring back to FIG. 2A, the process operation module 217 may perform the one or more operations on the received information to identify the storage access details for the predefined time period of the target system 103. The process operation module 217 may process the information by performing error detection and correction, selection of the data window, normalization, segregation, data labelling, and data enrichment on the one or more system parameters. The error detection and correction, selection of the data window, normalization, segregation and data labelling are performed based on known techniques. The process operation module 217 performs the data enrichment by selecting a first-time interval and a second time interval. The first time internal and the second time interval is associated with historic data of the one or more applications for a predetermined duration. The first-time interval is associated with a short duration, such as, for example, one week and the second time interval is associated with a long duration, such as, six months.

The process operation module 217 may merge plurality of storage access dataset 203 with a plurality of Application Programming Interface (API) access dataset 205 in the first-time interval based on a predefined threshold time. For example, consider block "bn" is accessed at "btn" and block "bn+1" is accessed at "btn+1". Similarly, the API "am" is accessed at "atm" and API "am+1" is accessed at "atm+1". In such case, if the difference of time interval of "btn" and "atm" is within a threshold "th", the data in these blocks may be considered within the same set, i.e. {bn, am, tn=(atm+btn)/2}. Consider, if the block "btn+1" is also within the threshold "th". In such case, the block "bn+1" may also be added to the dataset. Thus, based on the merged dataset, the process operation module 217 may determine the storage access details. In an embodiment, the plurality of storage access dataset 203 is merged with the plurality of API access dataset 205 when a difference of time interval between the storage access dataset 203 and the API access dataset 205 is within a predefined threshold time.

The configuration estimation module 219 may estimate the ideal configuration for the target system 103 based on the current requirement of one or more system parameters and the identified storage access details. The configuration estimation module 219 may estimate the ideal configuration by using at least one of the rule-based model, the neural network model, and the statistical model. The configuration estimation module 219 may estimate the configuration for the target system 103 using the rule-based model by checking the usage of the one or more system parameters by the one or more applications based on a predefined threshold value of one or more corresponding system parameters. For instance, usage for each system parameter is defined for the target system 103. In such case, if the usage reaches the predefined threshold value, the configuration estimation module 219 initiates deployment of the one or more applications at the predefined time. Thereafter, the configuration estimation module 219 may determine the ideal configuration for the target system 103 which is required for deploying the one or more applications for the predefined time.

Further, the configuration estimation module 219 may identify a lean time period for other applications associated with a fixed capacity system in order to utilise available system resources. In such case, the configuration estimation module 219 may select a time-interval within which the lean time period is to be calculated along with a minimal lean time. The time-interval is divided into predefined equal intervals. For example, the time intervals may be, TM={T0, T1 ... Tm}, such that (Tn+1−Tn) is less than the minimum of lean time period. The configuration estimation module 219 determines the lean time period for a predefined one or more system parameters, such as, memory, network and the like. A total requirement of the one or more system parameters required by the other applications is calculated at the plurality of intervals. In an embodiment, the plurality of intervals is stored, if the total interval of the plurality of intervals is within a preset threshold of time interval. Thus, the configuration estimation module 219 selects a minimal time interval among the plurality of intervals which spans for maximum durations and identifies the lean time period within the selected minimal time interval.

Figure 2C:
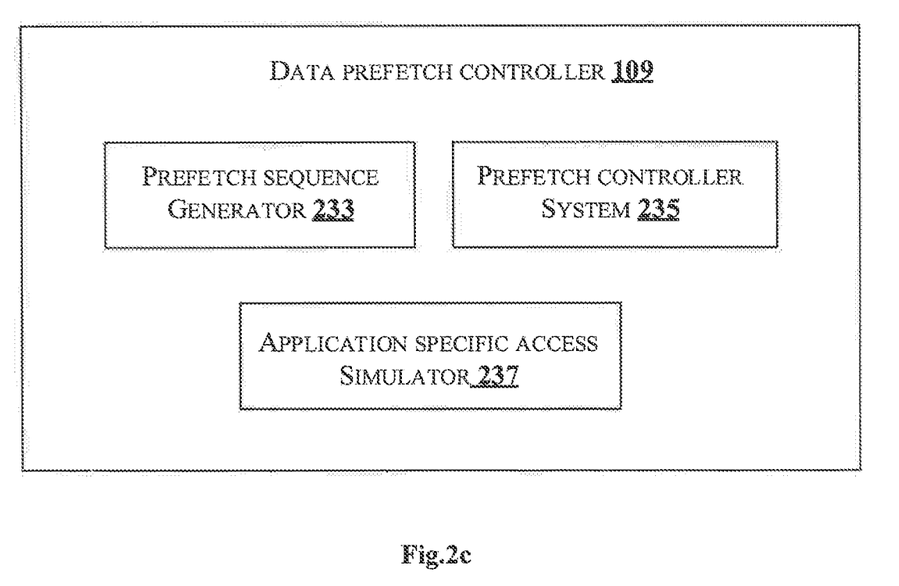
FIG. 2c show an exemplary block diagram of data prefetch controller of target system in accordance with some embodiments of the present disclosure.

Further, the configuration estimation module 219 may predict prefetch block using the neural network model. FIG. 2c show an exemplary block diagram data prefetch controller of target system in accordance with some embodiments of the present disclosure. As shown, the data prefetch controller 109 includes a prefetch sequence generator 233, a prefetch controller system 235 and an application specific access simulator 237. The prefetch sequence generator 233 may generate optimized operation sequence, for example, block read of storage device, network initialization, last called API's etc. The prefetch controller system 235 may take specific operation sequence from the prefetch sequence generator 233 and call required platform service calls, for example, block read from storage. Once the initial initialization is performed, the application specific access simulator 237 performs application usage simulation, for example, call last API's, access static web pages etc., to validate the data cache and latency. In an embodiment, the configuration estimation module 219 may ascertain if required capacity is achieved or any initialization of the underlaying system is needed.

Further, the configuration estimation module 219 caches the storage blocks based on memory utilisation by obtaining the plurality of storage access dataset 203 and the plurality of Application Programming Interface (API) access dataset. The configuration estimation module 219 examines total number of unique blocks from the plurality of storage access dataset 203 and the plurality of Application Programming Interface (API) access dataset 205. Based on the examining, the configuration estimation module 219 adds the unique blocks to a prefetch set, in case the available memory is more than a predefined percentage. Thus, the configuration estimation module 219 identifies and transmits the storage blocks. Alternatively, in case the memory becomes available, the configuration estimation module 219 rechecks the available memory and selects a predefined used blocks from the plurality of storage access dataset 203 and the plurality of Application Programming Interface (API) access dataset 205. Thereafter, the storage blocks are transmitted based on the selected predefined used blocks for prefetching.

The deployment module 221 may perform the dynamic deployment of the one or more applications based on the ideal configuration.

Exemplary Scenario:

Consider a scenario for vertical scaling of applications in an enterprise system. Typically, any enterprise system may work for specific time duration and hence usage of applications may vary for different time periods and for different days. Each of the applications may utilise system resources. For instance, consider, the system resources such as, CPU processing, network utilization such as, internet application and website browsing are utilised around eighty percentages during morning 6:am-5 pm on Monday to Friday. Further, the usage of these system resources decreases to 20 percentage during evening time after 5:pm to 6:am. In such case, the application deployment system 101 may cache the applications or specific websites utilised by the users in different time duration. For example, the applications utilised during 5:pm to 6:am may be cached with the configuration limited to the system resources required during the time period of 5:pm to 6: am. Thus, the configuration with the limited resources is deployment dynamically at 5:pm to 6:am in real-time.

Figure 5:
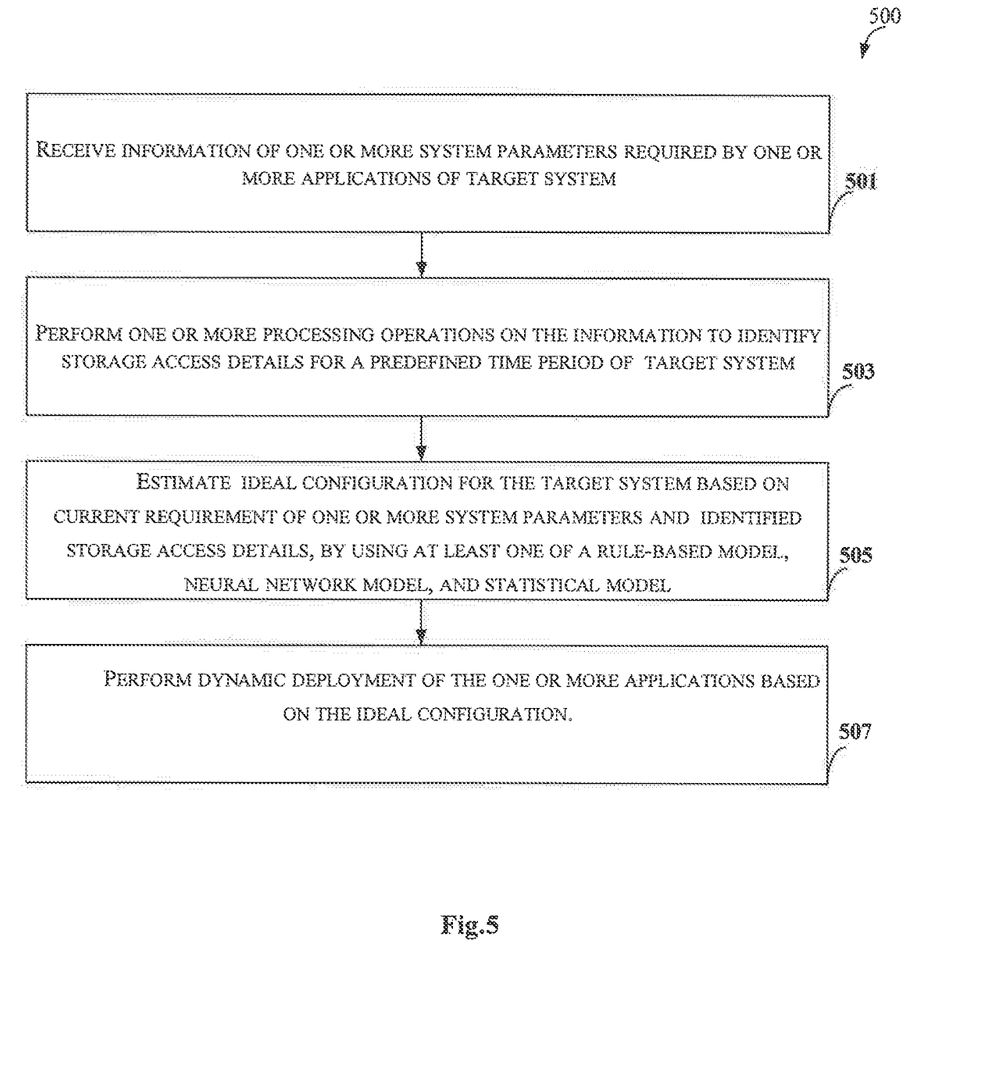
FIG. 5 illustrates a flowchart showing a method for dynamic deployment and vertical scaling of applications in a cloud environment in accordance with some embodiments of present disclosure.

FIG. 5 illustrates a flowchart showing a method for dynamic deployment and vertical scaling of applications in a cloud environment in accordance with some embodiments of present disclosure.

As illustrated in FIG. 5, the method 500 includes one or more blocks for dynamic deployment and vertical scaling of applications in a cloud environment. The method 400 may be described in the general context of computer executable instructions. Generally, computer executable instructions can include routines, programs, objects, components, data structures, procedures, modules, and functions, which perform particular functions or implement particular abstract data types.

The order in which the method 500 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 501, the information of the one or more system parameters are received by the receiving module 213.

At block 503, the one or more processing operations are performed by the process operation module 217 on the received information to identify storage access details for the predefined time period of the target system 103. In an embodiment, the storage access details comprise information on previously accessed and cached storage blocks.

At block 505, the ideal configuration for the target system 103 is estimated by the configuration estimation module 219 based on the current requirement of the one or more system parameters and the identified storage access details. The ideal configuration is estimated by using the rule-based model, the neural network model, and the statistical model.

At block 507, the deployment module 221 may deploy the one or more applications based on the ideal configuration.

Figure 6:
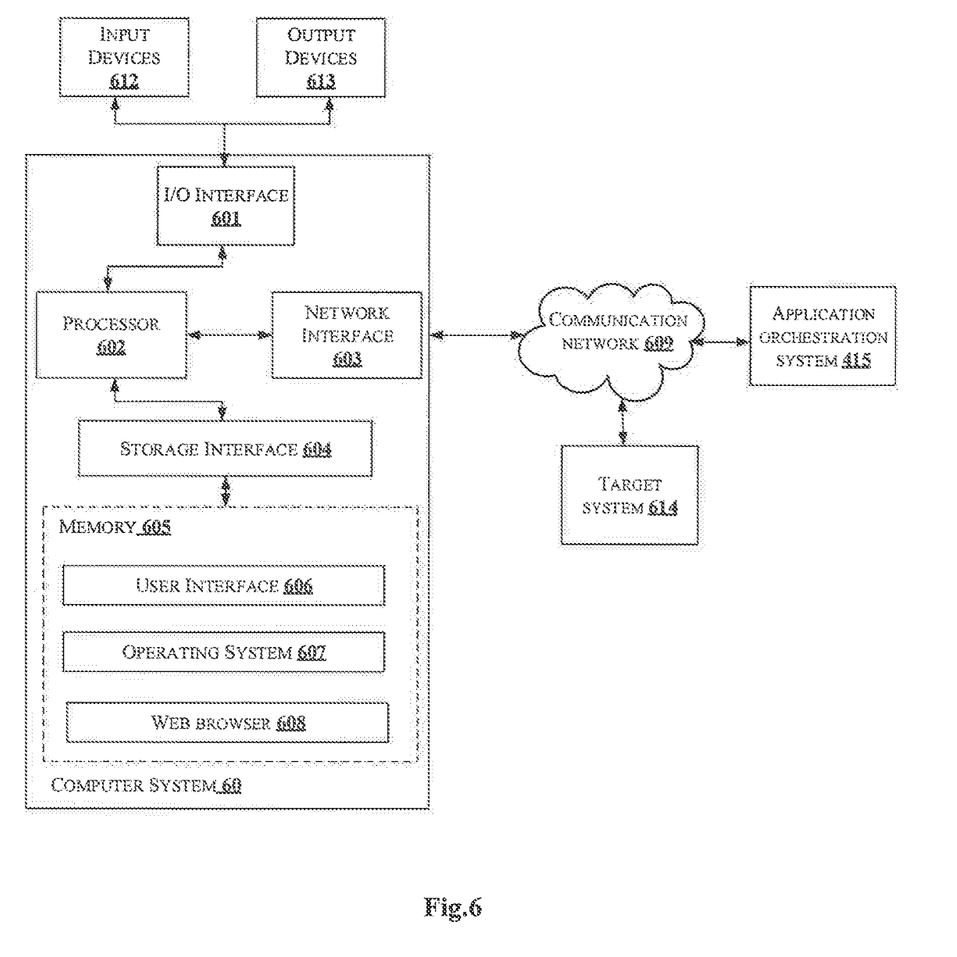
FIG. 6 illustrates a block diagram of an exemplary computer system for implementing embodiments consistent with the present disclosure.

FIG. 6 illustrates a block diagram of an exemplary computer system 600 for implementing embodiments consistent with the present disclosure. In an embodiment, the computer system 600 may be used to implement the application deployment system 101. The computer system 600 may include a central processing unit ("CPU" or "processor") 602. The processor 602 may include at least one data processor for dynamic deployment and vertical scaling of applications in a cloud environment. The processor 602 may include specialized processing units such as, integrated system (bus) controllers, memory management control units, floating point units, graphics processing units, digital signal processing units, etc.

The processor 602 may be disposed in communication with one or more input/output (I/O) devices (not shown) via I/O interface 601. The I/O interface 601 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 601, the computer system 600 may communicate with one or more I/O devices such as input devices 612 and output devices 613. For example, the input devices 612 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output devices 613 may be a printer, fax machine, video display (e.g., Cathode Ray Tube (CRT), Liquid Crystal Display (LCD), Light-Emitting Diode (LED), plasma, Plasma Display Panel (PDP), Organic Light-Emitting Diode display (OLED) or the like), audio speaker, etc.

In some embodiments, the computer system 600 consists of the application deployment system 101. The processor 602 may be disposed in communication with the communication network 609 via a network interface 603. The network interface 603 may communicate with the communication network 609. The network interface 603 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 409 may include, without limitation, a direct interconnection, local area network (LAN), wide area network (WAN), wireless network (e.g., using Wireless Application Protocol), the Internet, etc. Using the network interface 603 and the communication network 609, the computer system 600 may communicate with target system 614 and application orchestration server 615. The network interface 603 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 609 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 602 may be disposed in communication with a memory 605 (e.g., RAM, ROM, etc. not shown in FIG. 6) via a storage interface 604. The storage interface 404 may connect to memory 605 including, without limitation, memory drives, removable disc drives, etc., employing connection protocols such as, serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 605 may store a collection of program or database components, including, without limitation, user interface 606, an operating system 607 etc. In some embodiments, computer system 600 may store user/application data, such as, the data, variables, records, etc., as described in this disclosure. Such databases may be implemented as fault-tolerant, relational, scalable, secure databases such as Oracle or Sybase.

The operating system 607 may facilitate resource management and operation of the computer system 600. Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNU™, etc.), IBM™ OS/2, MICROSOFT™ WINDOWS™ (XP™, VISTA™/7/8, 10 etc.), APPLE® IOS™, GOOGLE® ANDROID™, BLACKBERRY® OS, or the like.

In some embodiments, the computer system 600 may implement a web browser 608 stored program component. The web browser 608 may be a hypertext viewing application, for example MICROSOFT® INTERNET EXPLORER™, GOOGLE® CHROME™, MOZILLA® FIREFOX™, APPLE® SAFARI™, etc. Secure web browsing may be provided using Secure Hypertext Transport Protocol (HTTPS), Secure Sockets Layer (SSL), Transport Layer Security (TLS), etc. Web browsers 408 may utilize facilities such as AJAX™, DHTML™, ADOBE® FLASH™, JAVASCRIPT™, JAVA™, Application Programming Interfaces (APIs), etc. In some embodiments, the computer system 400 may implement a mail server stored program component. The mail server may be an Internet mail server such as Microsoft Exchange, or the like. The mail server may utilize facilities such as ASP™, ACTIVEX™, ANSI™ C++/C#, MICROSOFT®, .NET™, CGI SCRIPTS™, JAVA™, JAVASCRIPT™, PERL™, PHP™, PYTHON™, WEBOBJECTS™, etc.

The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 400 may implement a mail client stored program component. The mail client may be a mail viewing application, such as APPLE® MAIL™, MICROSOFT® ENTOURAGE™, MICROSOFT® OUTLOOK™, MOZILLA® THUNDERBIRD™, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

An embodiment of the present disclosure optimizes vertical scaling.

An embodiment of the present disclosure does not depend on the static configuration, but continuously predict ideal configuration based on the actual usage of the application.

An embodiment of the present disclosure ensures no delay of response time after the movement of applications.

An embodiment of the present disclosure creates window of available fee resource after optimization for other application in case of fixed capacity model.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media include all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as, an optical fiber, copper wire, etc. The transmission signals in which the code or logic is encoded may further include a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" includes non-transitory computer readable medium, hardware logic, and/or transmission signals in which code may be implemented. A device in which the code implementing the described embodiments of operations is encoded may include a computer readable medium or hardware logic. Of course, those skilled in the art will recognize that many modifications may be made to this configuration without departing from the scope of the invention, and that the article of manufacture may include suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 6 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference number | Description |
| --- | --- |
| 100 | Environment |
| 101 | Application deployment system |
| 103 | Target system |
| 105 | Orchestration application server |
| 107 | Database |
| 109 | Data prefetch controller |
| 111 | Data colector agent |
| 113 | Operating system |
| 115 | System resources |
| 117 | I/O interface |
| 119 | Memory |
| 121 | Processor |
| 200 | Data |
| 201 | System parameters |
| 203 | Storage access data |
| 205 | API access data |
| 207 | Models |
| 209 | Other data |
| 211 | Modules |
| 213 | Receiving module |
| 215 | Training module |
| 217 | Process operation module |
| 219 | Configuration estimation module |
| 221 | Deployment module |
| 223 | Other modules |
| 225 | Communication access controller |
| 227 | CPU usage collector |
| 229 | Storage access collector |
| 231 | Memory usage collector |
| 233 | Prefetch sequence generator |
| 235 | Prefetch controller system |
| 237 | Application specific access simulator |
| 600 | Computer system |
| 601 | I/O interface |
| 602 | Processor |
| 603 | Network interface |
| 604 | Storage interface |
| 605 | Memory |
| 606 | User interface |
| 607 | Operating system |
| 608 | Web browser |
| 609 | Communication network |
| 612 | input devices |
| 613 | Output devices |
| 614 | Target system |
| 615 | Application orchestration server |

What is claimed is:

1. A method of dynamic deployment and vertical scaling of applications in a cloud environment, the method comprising:

receiving, by an application deployment system, information of one or more system parameters required by one or more applications of a target system;

performing, by the application deployment system, one or more processing operations on the information to identify storage access details for a predefined time period of the target system, wherein the storage access details comprises information on previously accessed and cached storage blocks, wherein the cached storage blocks comprise storage blocks cached based on memory utilization by:

obtaining a plurality of storage access dataset and a plurality of Application Programming Interface (API) access dataset from a database;

examining a total number of unique blocks from the plurality of storage access dataset and the plurality of API access dataset and performing:

(a) adding the unique blocks to a prefetch set, if available memory is more than a predefined percentage and perform (d); or (b) adding a predefined number of repeated blocks in the prefetch set, if the available memory is less than a requirement;

(c) rechecking the available memory and selecting predefined used blocks from the plurality of storage access dataset and the plurality of API access dataset, in case the memory becomes available; and (d) identifying and transmitting the storage blocks based on the selected predefined used blocks for prefetching;

estimating, by the application deployment system, an ideal configuration for the target system based on current requirement of one or more system parameters and the identified storage access details, by using at least one of a rule-based model, a neural network model, and statistical model, wherein estimating the ideal configuration further comprising determining a lean time period for other applications to utilize available system resources; and performing, by the application deployment system, dynamic deployment of the one or more applications based on the ideal configuration.

2. The method as claimed in claim 1, wherein the one or more system parameters comprises Central Processing Unit (CPU) utilization, memory, cache memory, and network utilization of the target system and information about one or more Application Programming Interface (API) access, CPU, memory, cache memory, and network utilization by the one or more applications.

3. The method as claimed in claim 1, wherein the one or more processing operations comprises error detection and correction, selection of a data window, normalization, segregation, data labelling, and data enrichment on the one or more system parameters.

4. The method as claimed in claim 3, wherein the data enrichment comprises:

selecting, by the application deployment system, a first time interval and a second time interval, wherein the first time interval and the second time interval is associated with historic data of the one or more applications for a predetermined duration;

merging, by the application deployment system, a plurality of storage access dataset with a plurality of Application Programming Interface (API) access dataset associated with the first time interval based on a predefined threshold time; and determining, by the application deployment system, storage access details based on the merged dataset.

5. The method as claimed in claim 4, wherein the plurality of storage access dataset is merged with the plurality of API access dataset when a difference of time interval between the storage access dataset and the API access dataset is within a predefined threshold time.

6. The method as claimed in claim 1, wherein estimating the configuration for the target system using the rule-based model comprises:
    checking, by the application deployment system, usage of the one or more system parameters based on a predefined threshold value of one or more corresponding system parameters;
    initiating, by the application deployment system, the deployment of the one or more applications based on the checking at a predefined time, wherein the one or more applications are deployed when the usage reaches the predefined threshold value; and
    determining, by the application deployment system, an ideal configuration for the target system required for deploying the one or more applications for the predefined time.

7. The method as claimed in claim 1, wherein the neural network model is trained using a plurality of historic application data.

8. The method as claimed in claim 1, wherein determining the lean time period for the other applications associated with a fixed capacity system to utilize the available system resources comprises:
    selecting a time-interval within which the lean time period is to be calculated along with a minimal lean time;
    dividing the time-interval into predefined equal intervals;
    determining the lean time period for a predefined one or more system parameters;
    calculating a total requirement of the one or more system parameters required by the other applications at a plurality of intervals, wherein the plurality of intervals is stored, if a total interval of the plurality of intervals is within a preset threshold of time interval;
    selecting a minimal time interval among the plurality of intervals which spans for maximum durations; and
    identifying the lean time period within the selected minimal time interval.

9. The method as claimed in claim 1 further comprising, before deployment of the one or more applications, orchestrating the target system based on the ideal configuration and continuously monitoring performance of the target system based on the ideal configuration.

10. The method as claimed in claim 9, wherein the orchestration of the target system is performed after performing a prefetch operation for the storage blocks and Application Programming Interface (API) in order to activate the cached storage blocks based on a predefined threshold time.

11. The method as claimed in claim 9 further comprising reconfiguring the target system to a previous configuration upon identifying performance issues based on the monitoring.

12. The method as claimed in claim 9 further comprising decommissioning previous configuration of the one or more applications based on the monitoring.

13. An application deployment system of dynamic deployment and vertical scaling of applications in a cloud environment, comprising:
    a processor; and
    a memory communicatively coupled to the processor, wherein the memory stores processor instructions, which, on execution, causes the processor to:
        receive information of one or more system parameters required by one or more applications of a target system;
        perform one or more processing operations on the received information to identify storage access details for a predefined time period of the target system, wherein the storage access details comprise information on previously accessed and cached storage blocks, wherein the cached storage blocks comprise storage blocks for which the processor performs caching based on memory utilization by:
            obtaining a plurality of storage access dataset and a plurality of Application Programming Interface (API) access dataset from a database;
            examining a total number of unique blocks from the plurality of storage access dataset and the plurality of API access dataset and performing:
                (e) adding the unique blocks to a prefetch set, if available memory is more than a predefined percentage and perform (h); or
                (f) adding a predefined number of repeated blocks in the prefetch set, if the available memory is less than a requirement;
                (g) rechecking the available memory and selecting predefined used blocks from the plurality of storage access dataset and the plurality of API access dataset, in case the memory becomes available; and
                (h) identifying and transmitting the storage blocks based on the selected predefined used blocks for prefetching;
        estimate an ideal configuration for the target system based on current requirement of one or more system parameters and the identified storage access details by using at least one of a rule-based model, a neural network model and statistical model, wherein the processor instructions, on execution, further cause the processor to determine a lean time period for other applications to utilize available system resources; and
        perform dynamic deployment of the one or more applications based on the estimated ideal configuration.

14. The application deployment system as claimed in claim 13, wherein the processor orchestrates the target system, before deployment of the one or more applications, based on the ideal configuration and continuously monitors performance of the target system based on the ideal configuration.

15. The application deployment system as claimed in claim 14, wherein the processor orchestrates the target system after performing a prefetch operation for the storage blocks and Application Programming Interface (API) in order to activate the cached storage blocks based on a predefined threshold.

16. The application deployment system as claimed in claim 14, wherein the processor reconfigures the target system to a previous configuration on identifying performance issues based on the monitoring.

17. The application deployment system as claimed in claim 13, wherein the processor determines the lean time period for the other applications associated with a fixed capacity system for utilizing the available system resources by:
    selecting a time-interval within which the lean time period is to be calculated along with a minimal lean time;
    dividing the time-interval into predefined equal intervals;
    determining the lean time period for a predefined one or more system parameters;
    calculating a total requirement of the one or more system parameters required by the other applications at a plurality of intervals, wherein the plurality of intervals are stored, if a total interval of the plurality of intervals is within a preset threshold of time interval;

selecting a minimal time interval among the plurality of intervals which spans for maximum durations; and identifying the lean time period within the selected minimal time interval.

18. A non-transitory computer readable medium including instructions stored thereon that when processed by at least one processor cause an application deployment system to perform operations comprising:

receiving information of one or more system parameters required by one or more applications of a target system;

performing one or more processing operations on the information to identify storage access details for a predefined time period of the target system, wherein the storage access details comprises information on previously accessed and cached storage blocks, wherein the cached storage blocks comprise storage blocks for which the processor performs caching based on memory utilization by:

obtaining a plurality of storage access dataset and a plurality of Application Programming Interface (API) access dataset from a database;

examining a total number of unique blocks from the plurality of storage access dataset and the plurality of API access dataset and performing:

(i) adding the unique blocks to a prefetch set, if available memory is more than a predefined percentage and perform (l); or (j) adding a predefined number of repeated blocks in the prefetch set, if the available memory is less than a requirement;

(k) rechecking the available memory and selecting predefined used blocks from the plurality of storage access dataset and the plurality of API access dataset, in case the memory becomes available; and (l) identifying and transmitting the storage blocks based on the selected predefined used blocks for prefetching;

estimating an ideal configuration for the target system based on current requirement of one or more system parameters and the identified storage access details, by using at least one of a rule-based model, a neural network model, and statistical model, wherein estimating the ideal configuration further comprising determining a lean time period for other applications to utilize available system resources; and performing dynamic deployment of the one or more applications based on the ideal configuration.

* * * * *